US008595799B2

(12) United States Patent
Afek et al.

(10) Patent No.: US 8,595,799 B2
(45) Date of Patent: Nov. 26, 2013

(54) ACCESS AUTHORIZATION (75) Inventors: Ifat Afek, Hod-Hasharon (IL); Nadav Sharir, Rishon Letzion (IL); Arik Sityon, Ganne Tiqwa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/449,908

(22) Filed: Apr. 18, 2012

(65) Prior Publication Data
US 2013/0283350 A1 Oct. 24, 2013

(51) Int. Cl.
H04L 9/32 (2006.01)
(52) U.S. Cl.
USPC .............................. 726/4; 709/227
(58) Field of Classification Search
None
See application file for complete search history.

(56) References Cited

U.S. PATENT DOCUMENTS

| | | | |
|---|---|---|---|
| 2006/0259955 A1* | 11/2006 | Gunther et al. ............ | 726/2 |
| 2007/0283443 A1 | 12/2007 | McPherson et al. | |
| 2010/0146584 A1 | 6/2010 | Haswarey et al. | |
| 2011/0247059 A1 | 10/2011 | Anderson et al. | |

OTHER PUBLICATIONS

Meng., et al., "An Extended Role Based Access Control Method for XML Documents", Sep. 2004, 6 pages.
Xie, et al., "A Role-based Dynamic Authorization Model and Its Implementation in PMI", 2008 International Conference on Computer Science and Software Engineering, Dec. 12-14, 2008, pp. 661-664.
Sandhu, et al.,"The NIST Model for Role-Based Access Control: Towards a Unified Standard", 5th ACM Workshop on Role Based Access Control, Jul. 26-27, 2000, Berlin, 17 pages.
Ni, et al., "Privacy-aware Role Based Access Control", SACMAT'07, Jun. 20-22, 2007, Sophia Antipolis, France, pp. 41-50.
Tahir, Muhammad N., "C-RBAC: Contextual Role-Based Access Control Model", Ubiquitous Computing and Communication Journal, vol. 2, No. 3, Jun. 30, 2007, pp. 67-74.
Kuhn, et al., "Adding Attributes to Role-Based Access Control", Published by the IEEE Computer Society, Jun. 2010, pp. 79-81.

* cited by examiner

Primary Examiner — Fikremariam A Yalew (57) ABSTRACT

Methods, systems, and computer-readable media with executable instructions stored thereon for managing access authorization to hardware and data resources. A method includes defining a property of a hardware and/or data resource. This example method further includes defining a role such that each defined role can be applied to different users without modification, defining a security domain for the property of the resource in the context of a user-role assignment and assigning a role to a user in a context of the defined security domain.

8 Claims, 8 Drawing Sheets

|  | TENANT 1 | TENANT 2 | TENANT 3 |
| --- | --- | --- | --- |
| USER1 | FULL | FULL | FULL |
| USER2 | VIEW | VIEW | - |
| USER3 | VIEW | FULL | VIEW |
| USER4 | - | VIEW | FULL |

ACCESS AUTHORIZATION

BACKGROUND

Many organizations, e.g., IT organizations, are managing vast amounts of resources and data. Those resources are being managed by different personas with different functions within the organization. This situation results in the need to restrict access to this data according to the persona's function within the organization, and therefore the ability to control, manage and authorize the access to those resources. Managing such an authorization model can be very complex and difficult due to the large amount of resources and functions.

DETAILED DESCRIPTION

Examples of the present disclosure include methods, systems, and computer-readable media with executable instructions stored thereon for managing access authorization to hardware and data resources. One example includes defining a property of a resource. This example method further includes defining a role such that each defined role can be applied to different users without modification. This example method further includes defining a security domain for the property of the resource and assigning a role to a user in a context of the defined security domain. As used herein, a property can be based on several properties, e.g., a set of properties, as well as relations between several resources, e.g., a security domain may contain all resources of type "computer" that are related to resources of type "hardisk".

Figure 1:
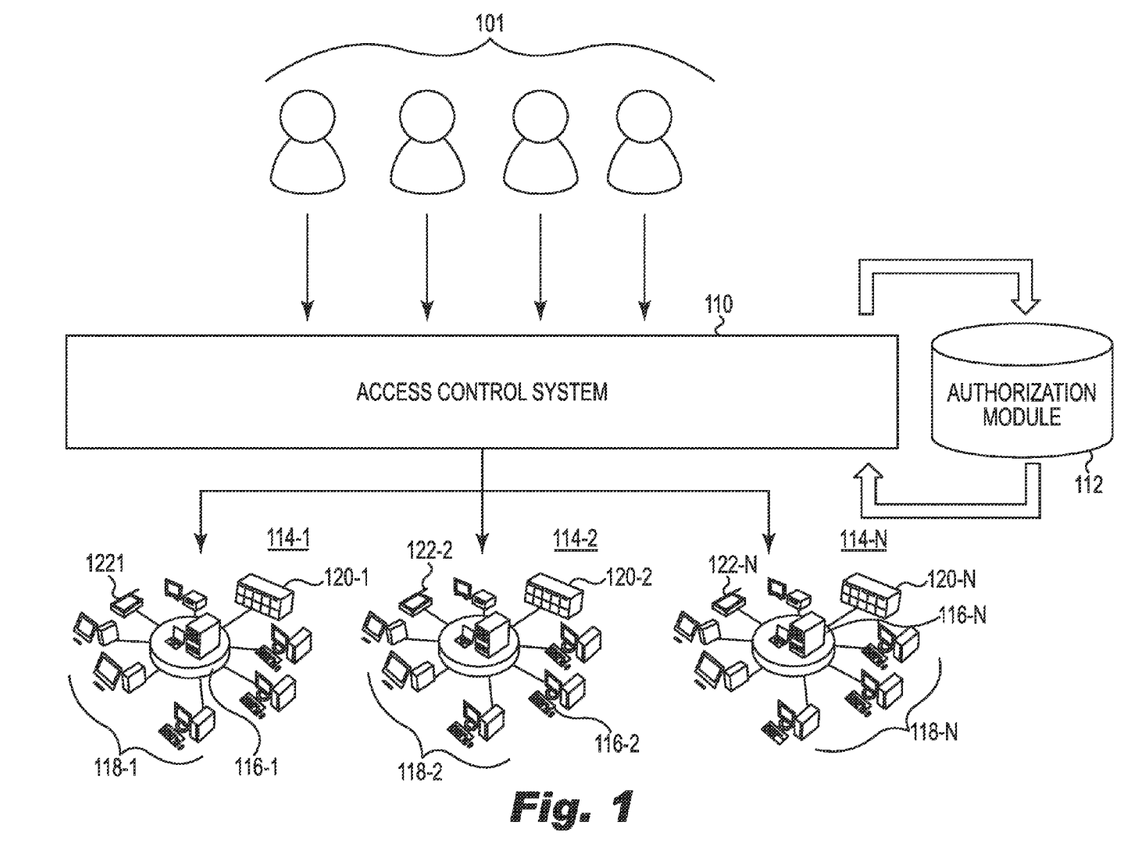
FIG. 1 is an example of a system environment for managing access authorization to multiple users requesting access to one or more network resources.

FIG. 1 is an example of a system environment for managing access authorization to hardware and data resources with multiple users requesting access to one or more networks including hardware and data resources. As shown in FIG. 1, multiple users 101 with different functions within an organization may seek access to IT resources, through an access control system 110, on various local and/or wide area networks (LANs/WANs) 114-1, 114-2, . . . , 114-N. The networks can include wired and wireless connections and can include intranet and internet connections. Each of the networks 114-1, 114-2, . . . , 114-N can include a number of network devices attached thereto. For example network 114-1 is illustrated including a management server 116-1, and number of computing devices 118-1 (e.g., desktops, workstations and/or laptops mobile devices, etc.), and a number of file servers and/or data storage 120-1. Network 114-2 is also illustrated having a management server 116-2, and number of computing devices 118-2 and a number of file servers and/or data storage 120-2. Network 114-N is also illustrated having a management server 116-N, and number of computing devices 118-N and a number of file servers and/or data storage 120-N.

It is noted that throughout this disclosure the designator "N" is used to indicate a variable number. The consistent use of the designator "N" is to ease reference, but does not intend that the same variable number is intended between its various uses. Further, the figures herein follow a numbering convention in which the first digit or digits correspond to the drawing figure number and the remaining digits identify an element or component in the drawing. Similar elements or components between different figures may be identified by the use of similar digits. For example, 101 may reference element "01" in FIG. 1, and a similar element may be referenced as 501 in FIG. 5.

As shown in FIG. 1, the access control system 110 can be connected to one or more databases 112 containing, e.g., storing, computer readable instructions (CRI), e.g., program instructions, defining an access authorization model according to one or more embodiments of the present disclosure. The complexity of defining and maintaining an access authorization model of large scale enterprise applications requires a huge amount of administrative work. The industry suggests several solutions of how to manage and control access to hardware and data resources according to a persona's function within an organization. One example is the Role Based Access Control (RBAC) model. However, the management around the RBAC model is still highly complex and hard to maintain administratively when it comes to authorizing large scale enterprise applications. Defining an authorization model according to the RBAC model will require a definition of permissions for concrete resources (e.g., hardware, software, firmware and data resources) for concrete roles (e.g., database (DB) expert, Unix expert, administrator, etc.) for each of a number of different regions within an organization. It is understood that different functions with the organization can actually be quite similar to each other and that resources can be classified by different qualifiers. In one embodiment, of the present disclosure, for example, computer executable instructions can be executed in connection with a particular model to classify some of the resources as related based on a specific "technical domain", such as "DB resource" or "Unix resource" within a region of a given organization. That is, each resource may be classified by its location (e.g., region). In one organizational scenario, there could be four (4)

regions, and there could exist a DB expert and a Unix expert for each one of the four regions.

In a standard authorization model (RBAC), which is based on a "white list" of roles and permissions for resources, eight (8) different roles would have to be created according to a Cartesian multiplier of the number of regions (4 in the above example) and technical domains (2 in the above example) so that each role will have the appropriate privileges to access a particular technical domain within a particular region. In large scale enterprise applications, this kind of model will be almost impossible to define and maintain, and the complexity will grow as the amount of classifications and functions within the organization increases. In the world of cloud computing, the management and maintenance problem is even more severe. A great example of this kind of complexity is the multi-tenancy problem, where one or more network users are granted certain defined access rights, permissions and/or privileges to particular hardware, software, firmware, and/or data resources, or a particular ownership property of a resource, e.g., a tenant property.

The present disclosure presents a solution to this problem by defining an entity named "security domains" (SD), which provides the capability of managing the privacy of the model according to different aspects of the hardware and data resources based on a "user-role" assignment. Through the present disclosure, service providers will be able to manage and maintain a complex authorization model in which a certain amount of data is visible to particular tenants, some of which is being shared among several tenants, and some is exclusive for each tenant. In the present disclosure there exists the ability to reuse a role definition and use different classifications in order to manage an authorization model more dynamically than other approaches.

Figure 2:
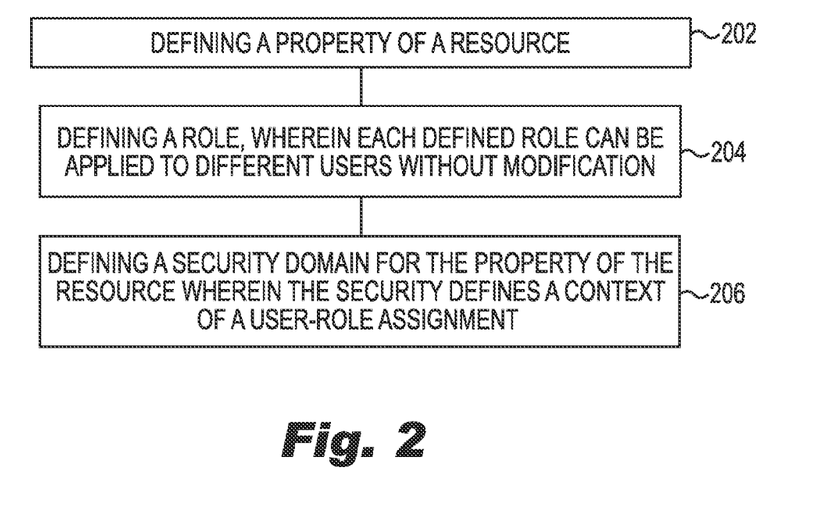
FIG. 2 is a flow chart illustrating an example of a method for access authorization to resources according to the present disclosure.

FIG. 2 is a flow chart illustrating an example of a method for access authorization to hardware and data resources according to the present disclosure. As shown in FIG. 2, at block 202, the method includes using a processing resource to execute computer readable instructions, e.g., program instructions, to define a property of a resource, e.g., a hardware, software, firmware, and/or data "type" of resource and/ or or a "location" of a resource. As defined more below (FIGS. 6 and 7), the processor and memory resources for storing and executing such program instructions can exist in the form of an access control engine, which can be provided to through the access control system 110 and one of more databases 112 of FIG. 1 having an authorization model according to the present disclosure.

As shown at 204, the method includes executing program instructions to define a role, wherein each defined role can be applied to different users without modification. By way of example and not by way of limitation, a defined role can include a database (DB) expert role, a Unix expert role, an administrator (admin) role, viewer role, etc. Further, program instructions can be executed to assign a permission to a role. For example, a permission may include at least one of an "edit and view" access right or may include a "view only" access right.

Further, at block 206, the method includes executing program instructions to define a security domain for the property of a resource in the context of a user-role assignment. In some embodiments, program instructions are executed to define a tenant as a set of resources sharing a particular property or an entity having ownership of a particular set of resources. The program instructions can further be executed to grant a defined role to a user in the context of a security domain. As one example, executing program instructions to define a security domain for a tenant allows the security domain to restrict permission of a user by a context of the security domain. Defining a security domain includes distinguishing between different resource scopes according to a classification of a resource. For example, a particular resource scope could include a classification of all resources that belong to a given region, tenant, and/or company, etc.

To achieve the same, program instructions can be executed to assign an attribute to a user-role assignment such that the attribute applies to all permissions for the user-role assignment rather than according to a permission by permission basis. Hence, assigning an attribute to a user-role assignment can include assigning a location attribute. Assigning an attribute to a user-role assignment can include assigning a purpose attribute. And, assigning an attribute to a user-role assignment can include assigning a condition attribute. These are examples, not to the exclusion of other attribute examples.

Figure 3:
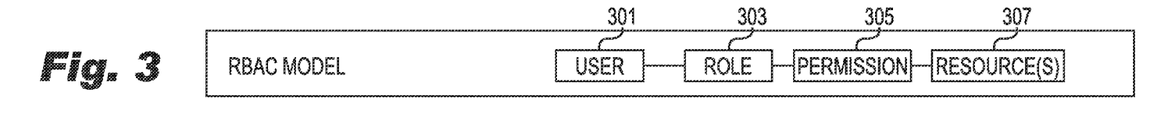
FIG. 3 illustrates a block diagram of an example of a prior art computer implemented model for role based access control (RBAC).

FIG. 3 illustrates a block diagram of a prior art computer implemented model for role based access control (RBAC). As shown in FIG. 3, the RBAC model defines that a user 301 is associated with a role 303, e.g., admin, DB expert, Unix expert, etc., which is then given permissions 305 for one or more particular resources 307. As used herein a "role" can include a set of permissions and a "permission" can include a specific permission, e.g., access right, such as edit_name, view_name, edit_phone, etc. By way of example and not by way of limitation, a permission could be extended to include an access right a right to edit data, programs, hardware configurations, etc.

Figure 4:
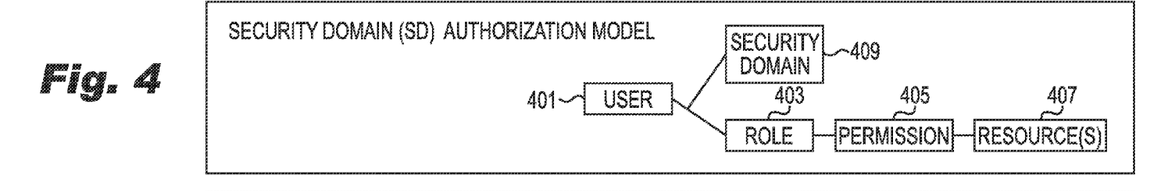
FIG. 4 illustrates a block diagram of a computer implemented security domain, role based access control (SD-RBAC) model according to an embodiment of the present disclosure.

FIG. 4 illustrates a block diagram of a security domain role based access control (SD-RBAC) according to an embodiment of the present disclosure. As mentioned above, program instructions are executed to create and manage a security domain as a definition that distinguishes between different resource scopes according to a classification of resources. Again the classification of resources can include all resources that belong to a given region, tenant and/or company, etc.

As shown in FIG. 4, the program instructions are executed to define a security domain 409 in the context of a property of a resource. The program instructions can then be executed to assign a role to a user, e.g., user 401 role 403 assignment, in the context of the security domain. The existence of the security domain restricts the users to seeing only the relevant subset of resources that exist within a generic role definition. In at least one embodiment of the present disclosure, a security domain is created and applied to each tenant within a multi-tenant environment. Assigning a role to a user in the context of a security domain provides a flexibility to mix and match between different parts, e.g., role definitions, users, tenants and resources, etc., to achieve better reusability.

Other approaches that have attempted to address issues connected with multi-domain, e.g., multi-technical domain, environments have suggested different extensions on the RBAC model. Though the RBAC model, shown in FIG. 3, defines constraints on user-role assignments, these constraints only handle separation of duty (SOD) issues. That is, those constraints define specific roles as mutually exclusive and do not address the issues of data sharing and privacy.

One previous approach includes a privacy-aware rule based access control (PA-RBAC) model which attempts to address limitations of conventional access control models with respect to privacy. Each permission in the PA-RBAC model consists of, aside from the action and resource, also the (1) intended purpose of the permission, (2) the conditions under which the permission is given, and (3) the obligations that must be performed if the permission is granted, e.g., attributes assigned on a permission by permission basis. This is in contrast to embodiments of the present invention which execute instructions to allow for defining an attribute as applying to all permissions of a user-role assignment.

Another previous approach includes contextual rule based access control (C-RBAC) which defines an extension of RBAC that has purposes and locations, e.g., attributes, based on role-permission assignments.

In contrast to both of these previous approaches embodiments of the present disclosure execute instructions to define the security domains based on a property of a resource and assign a role to a user in the context of the security domain. Hence the security domains described herein allow purpose, location and/or condition, etc., e.g., attributes, to be special cases of a given security domain. This is more suitable for environments containing huge amounts of data, and is easier to manage since, for example, there is no need to define a purpose, location and/or condition for every single permission assignment. Another advantage over the previous approaches is that embodiments allow the program instructions to execute to reuse roles for different users, without modifying the role definitions which is particularly useful in enterprise server environments where there can be hundreds of tenants and consequently hundreds of security domains.

Figure 5:
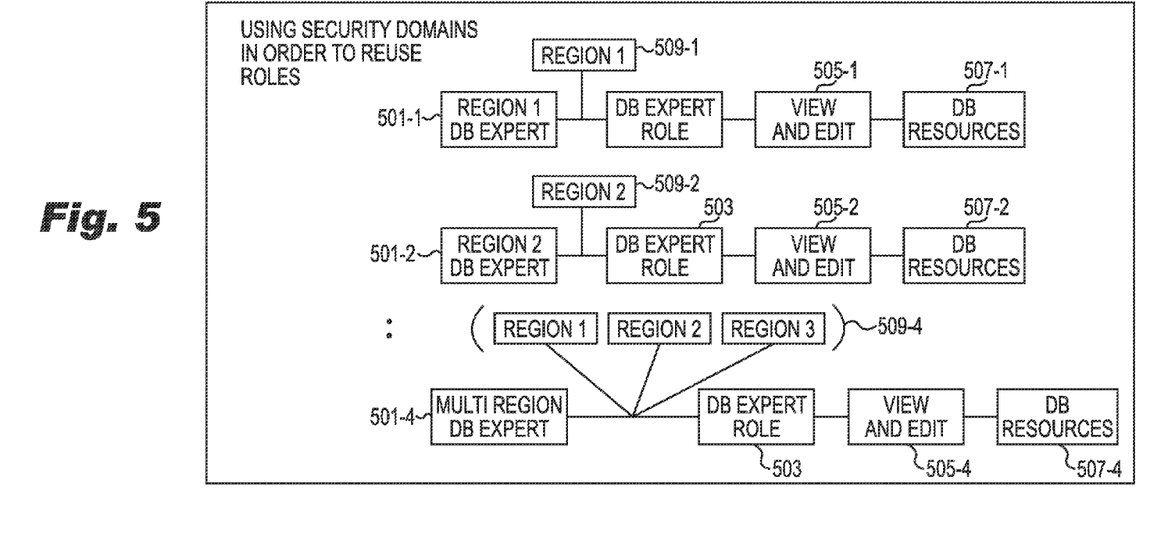
FIG. 5 illustrates a block diagram of an example of a computer implemented security domain, role based access control (SD-RBAC) model according to an embodiment of the present disclosure.

FIG. 5 illustrates a block diagram of an example of a security domain, role based access control (SD-RBAC) model according to an embodiment of the present disclosure. From the example given in FIG. 4, program instructions can be executed to define a security domain for a property of a resource, e.g., a tenant property and/or region attribute. That is, given a first region (1), a second region (2), a third region (3), and a multi-region (4) classification, the program instructions are executed to define four (4) security domains, one for each region classification where the hardware, software, firmware and data resources of that region are the tenant, so that visibility of resources can be restricted per region. As shown in FIG. 5, program instructions can be executed to define a security domain based on a location property, e.g., region, of a resource and the same role can be granted to different users in the context of different security domains, e.g. region1 DB expert user 501-1 is granted the DB expert role in the context of region1 security domain 509-1, region2 DB expert user 501-2 is granted the DB expert role in the context of region2 security domain 509-2, and multi-region DB expert 501-4 is granted the DB expert role in the context of 3 security domains: region1 509-1, region2 509-2 and region3 509-3.

Hence, as a result of the present embodiment, is not necessary to define the combinations of tenants as new tenants and it is not necessary to duplicate roles, e.g., it is easy to maintain the DB expert role 503 regardless of a particular region's tenant (e.g., hardware, software, firmware and data resources). Thus, it is possible to define a role assignment in the context of several tenants.

According to an embodiment of the present disclosure the program instructions are executed to create, define and maintain a dynamic security domain in the sense that a change in a classification (e.g., by attribute change, region, etc.) of underlying tenant's resources will automatically affect the scope of the security domain definition. In this manner an access authorization model is provided that offers flexibility and ease to managing the authorization model of large scale enterprise applications. By way of example and not by way of limitation, the above illustration may be described as an efficient role reusability in a two-dimensional authorization model.

Figure 6:
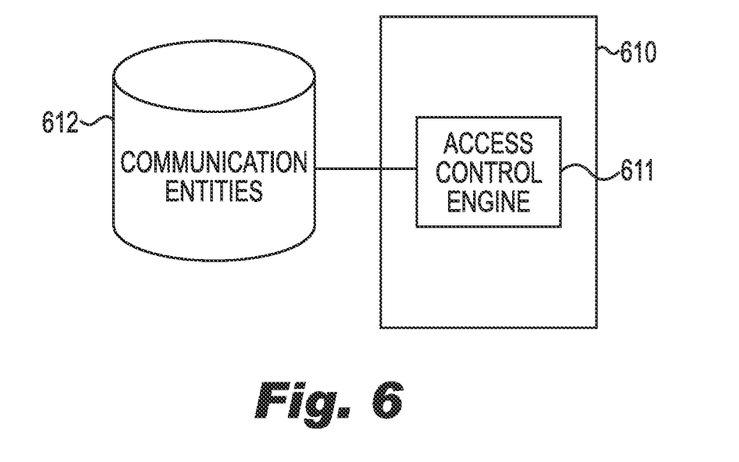
FIG. 6 illustrates a system according to an example of the present disclosure.

FIG. 6 a system according to an example of the present disclosure. As shown in FIG. 6, physical and logical connections are shown to illustrate execution of the program instructions described in the various embodiments. FIG. 6 illustrates and access control system 610 in communication with a database 612. The access control system 610 and the database 612 can include the access control system 110 and database 112 shown in FIG. 1. In the example embodiment shown in FIG. 6, the access control system 610 includes hardware, firmware and software executing together to provide an access control engine wherein the hardware, e.g., processor and memory, function to execute the code, e.g., program instructions described herein, to implement specific defined functions. As described above, the program instructions saved in the one or more databases 612 may be retrieved and executed by one or more processing resources, e.g., access control engine 611, to execute the actions described herein.

Figure 7:
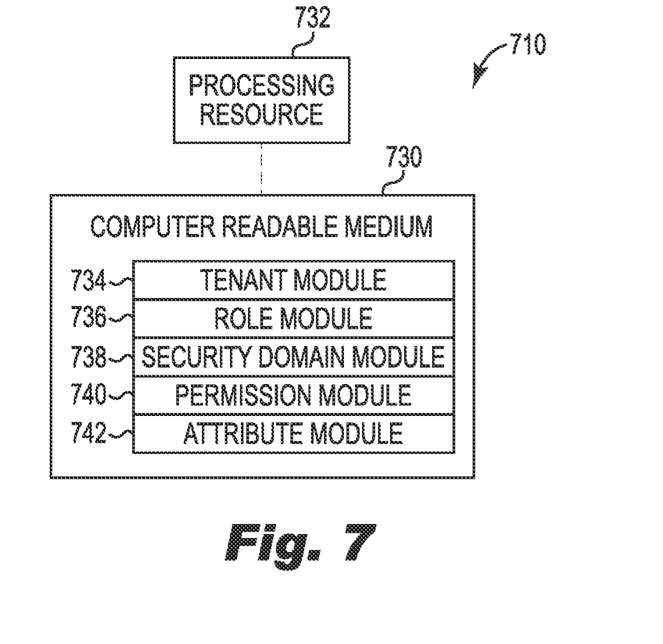
FIG. 7 is a block diagram depicting a memory and a processing resource according to an example of the present disclosure.

FIG. 7 is a block diagram depicting a memory and a processing resource according to an example of the present disclosure. FIG. 7 illustrates that the present disclosure can include sets of program instructions segmented into different program modules and shared over a distributed computing network to achieve the acts and/or functions of the present disclosure. By way of example and not by way of limitation, FIG. 7 illustrates that the program instructions may be located on a tangible, non-transitory computer readable medium 730 and that the hardware can include a processing/processor resource 732 coupled thereto. Medium 730 may store program instructions, described herein, that when executed by the processing resource 732 implements an access control system, as shown in FIG. 1, according to embodiments of the present disclosure. Processing resource 732, for example, can include one or multiple processors. Such multiple processors may be integrated in a single device or distributed across several networked devices. Medium 730 may by integrated in the same device as processor resource 732. In one example, the program instructions can be part of an installation package that when executed by the processing resource 732 implement the access authorization model described herein.

In various embodiments, the medium 730 can include a portable medium such as a CD, DVD, of flash (non-volatile) drive or a memory maintained by a server from which the installation package can be downloaded and installed. In another embodiment, the program instructions can be part of an application already installed. Here, the medium 730 can include integrated memory such as a hard drive, solid state drive (SSD) according to the SATA standard, or the like.

In FIG. 7, the computer readable medium 730 can include a "tenant" module 734 having a specified set of program instructions executable by the processing resource 732 to define a tenant as including properties of a hardware and/or data resource, e.g., location and or ownership entity, etc., to structure a multi-tenant environment, as describe herein. As show in FIG. 7, the computer readable medium 730 can include a "role" module 736 having a specified set of program instructions executable by the processing resource 732 to define a role, as described herein, wherein each defined role can be applied to different users without modification. Examples of a role have been given above.

The computer readable medium 730 can include a "security domain" module 738 having a specified set of program instructions executable by the processing resource 732 to define a security domains based on a property of a resource and assign a role to a user in the context of the security domain. Further the computer readable medium 730 can include a "permission" module 740 having a specified set of program instructions executable by the processing resource 732 to define at least one permission, as described herein, for the tenant based on a user-role assignment and grant a role to a user in the context of a security domain.

The computer readable medium 730 can include an "attribute" module 742 having a specified set of program instructions executable by the processing resource 732 to define at least one attribute, e.g., a purpose, location, and/or region, such that the attribute applies to all permissions in a user-role assignment and not on a permission by permission basis.

Figure 8:
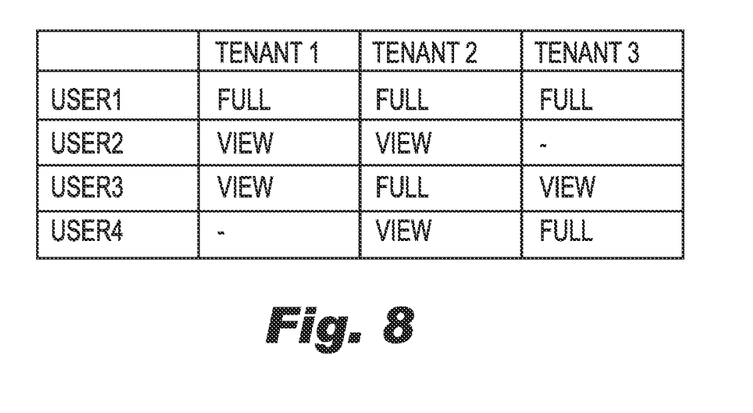
FIG. 8 is an illustration of an example of a multi-tenant environment in which each tenant has a property, e.g. ownership entity or location, of one or more resources and users are allowed access to only specific tenant resources according to certain definitions.

FIG. 8 is an illustration of an example of a multi-tenant environment in which each tenant has a property, e.g., ownership entity and/or location, of one or more resources and users are allowed access to only specific tenant resources according to certain definitions. According to one or more embodiments, the program instructions execute to enforce a requirement that allow users (e.g., by way of example and not by way of limitation, users 101 from FIG. 1 and/or users 501 from FIG. 5) to access only specific tenants' resources and executes to define whether the users have "full" access to those resources (e.g., view and edit access) or "view only" (e.g., view access) to those resources.

In the example of FIG. 8, three tenants (e.g. tenant #1, tenant #2, tenant #3), as described and defined above, are illustrated. For ease of illustration only 4 different users (e.g. user #1, user #2, user #3, and user #4) are illustrated. As shown in FIG. 8, the program instructions are executed in a manner that achieves the illustrated permissions. According to embodiments, the program instructions are executed to define a tenant as a property to a hardware, software, firmware and/or data resource, or combination thereof, e.g., an ownership and/or location. Thus, the embodiment of FIG. 8 illustrates a multi-tenant environment. Further, in order to implement such an authorization model, the program instructions are executed to create and define three (3) security domains, one for each tenant, e.g., hardware, software, firmware and/or data resource, or combination thereof based on a logical relationship for the same (such as entity ownership or location). The program instructions are further executed to define two (2) roles, e.g., one for "full" permission (so called "admin" to "edit and view") and one for "view only" permission (so called "viewer" to only view, but not edit). According to embodiments, a security domain definition includes the ability to assign a role to a user in the context of a security domain. In the example embodiment above there is one security domain per tenant, and it is possible to assign a role to the user in the context of multiple security domains.

For example, according to embodiments, the program instructions will execute to create and define a security domain to allow that user #2 will be associated with the "viewer" role with the context of tenant #1 and tenant #2. Further, the program instruction will execute to create and define a security domain to allow that user #4 will be associated with the "viewer" role with the context of tenant #2 and execute to allow that user #4 will be associated with the "admin" role with the context of tenant #3.

Other models that were considered in contrast to the model embodiments described herein include (1) creating program instructions that could be executed to define a "security domain" (SD) restriction based principally on a "user", and (2) creating program instructions that could be executed to define a "security domain" (SD) restriction based principally on a "role". The first option would not satisfy a first set of authorization uses and/or goals, where a certain "user" may have some permissions for security domain "X" and other permissions for security domain "Y". The second option would not satisfy a second set of authorization uses and/or goals by involving duplication of "roles", since this would involve instructions executing to enforce the creation of a separate "Admin role X" and "Admin role Y". The present embodiments, execute program instructions to reuse the same "Admin" role and assign it to user #1 with security domain X and to user 2 with security domain Y.

The above described model is further contrasted with the "open view model" (OVO) as offered by Hewlett-Packard presently. The OVO model consists of a combination of groups and categories in a manner that when granting permission to a user profile (e.g., like a "role" in the RBAC model) the permission is given by the intersection between the groups and the categories. This means that the OVO model restricts groups by categories. In the OVO model the restriction is done in the "context" of a user profile. In the above example, this model would involve defining six (6) user profiles to cover the permutations—three (3) user profiles with "full" permissions, one of each tenant, and three (3) additional user profiles with "view" permissions, one for each tenant.

In contrast, the embodiments of the present disclosure execute instructions to define only two (2) reusable roles, one for "full" permissions and one for "view only" permissions in connection with executing instructions to restrict these "user-role" assignments to a specific defined "security domain". That is, according to embodiments of the present invention only three (3) "security domains" are defined, one for each "tenant", dependent on the "user-role" assignments.

The present embodiments further execute instructions differently than an Attributes Based Access Control (ABAC) model. That is, upon first pass it may seem that the present disclosure resembles a Role Centric combined approach of RBAC and ABAC. However, in the concept of restricting, there is a fundamental difference between the embodiments described herein and that of a combined Role-Centric RBAC and ABAC approach. The role-centric approach allows restricting RBAC using attributes that may be put on "users" or "resources" (e.g., the hardware, software, firmware and data resources). It does not allow program instructions to execute to have different restrictions for different "user-role" associations. In contrast, the program instructions described with the embodiments herein execute to allow the same by using a "security domain's" context on the "user-role" assignments.

In the above example of FIG. 8, it is impossible to have only two (2) distinct roles (e.g., "Admin" and "Viewer") using the Role-Centric approach. If user #4 has attributes of tenant #2 and tenant #3, then this user must be a an "Admin" to either both tenants #2 and tenant #3 or none of them. This user cannot be a an "Admin" of tenant #3 and a "Viewer" of tenant #2 unless six (6) specific roles are defined, e.g., tenant #1/Viewer, tenant #1/Admin, tenant #2/Viewer, etc, two for each tenant.

Hence, the above OVO mode would have six (6) roles (user profiles), e.g., tenant #1/Viewer, tenant #1/Admin, tenant #2/Viewer, etc. Likewise the Role-Centric combination would have (6) roles, e.g., tenant #1/Viewer, tenant #1/Admin, tenant #2/Viewer, etc. In contrast, as mentioned above, the embodiments of the present disclosure execute program instructions to represent the security domain as a way to restrict the permission of a user by context.

Figure 9:
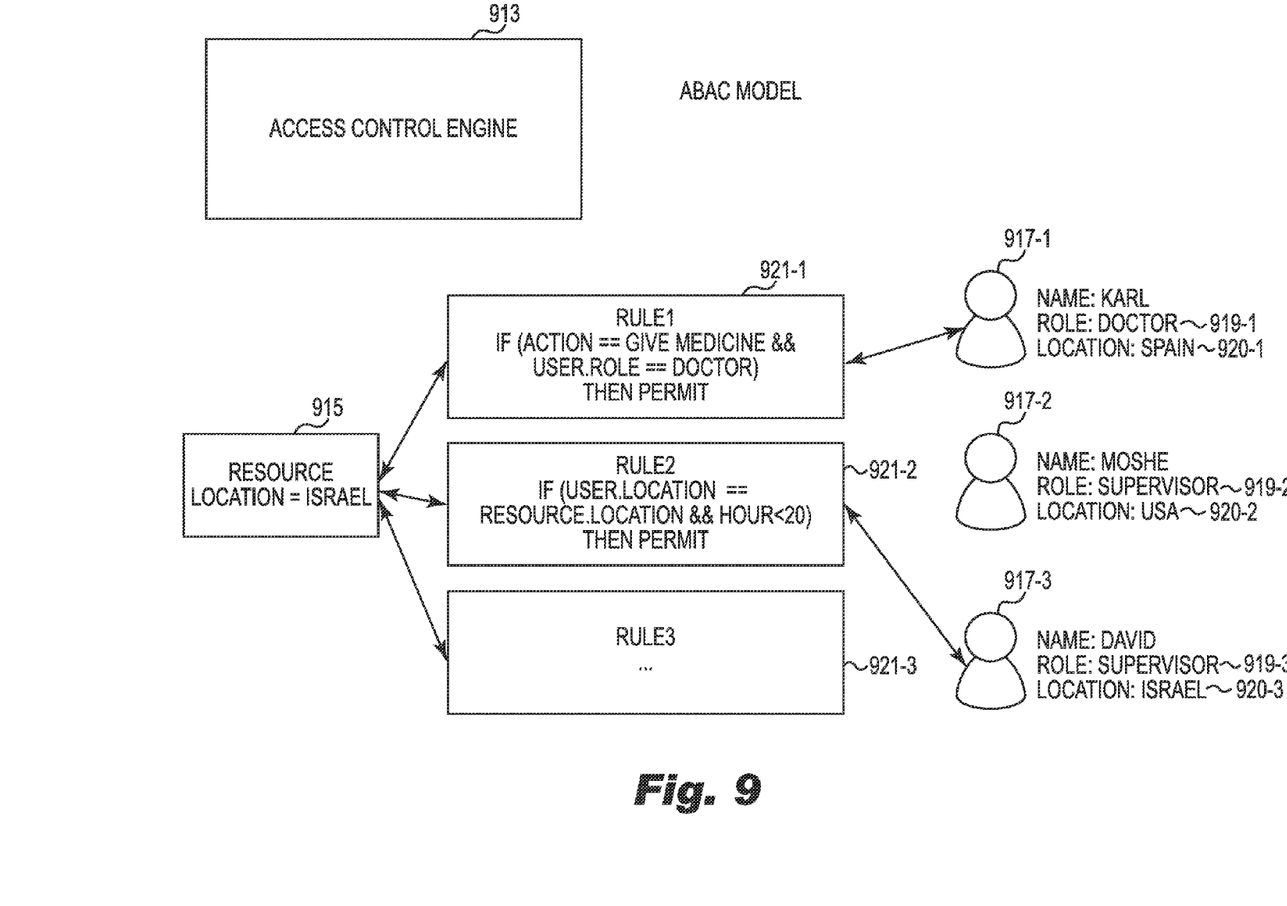
FIG. 9 illustrates an example of a prior art computer implemented model for access authorization according to an attributes based access control (ABAC) approach.
Figure 10:
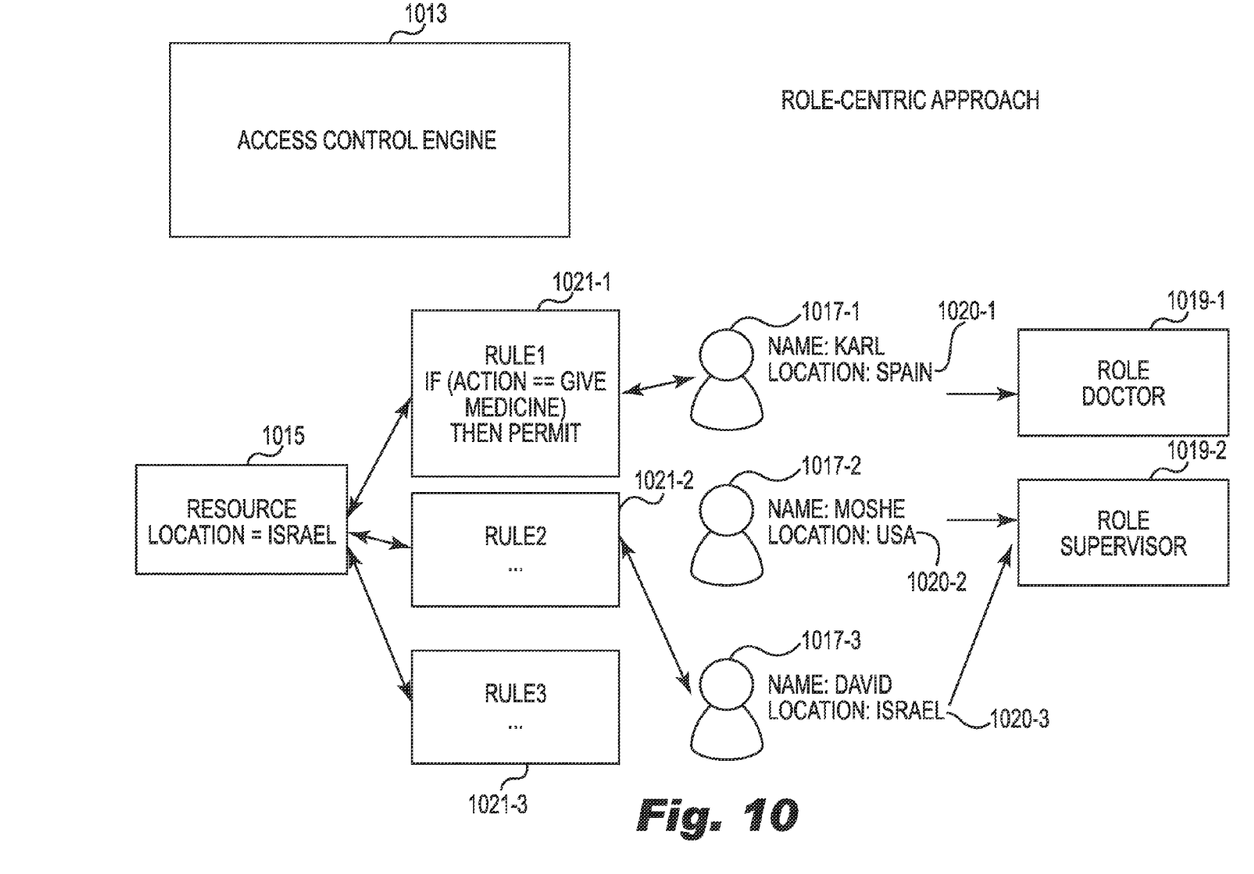
FIG. 10 illustrates an example of a prior art computer implemented model for role centric access authorization according to a combination of an ABAC and RBAC.
Figure 11:
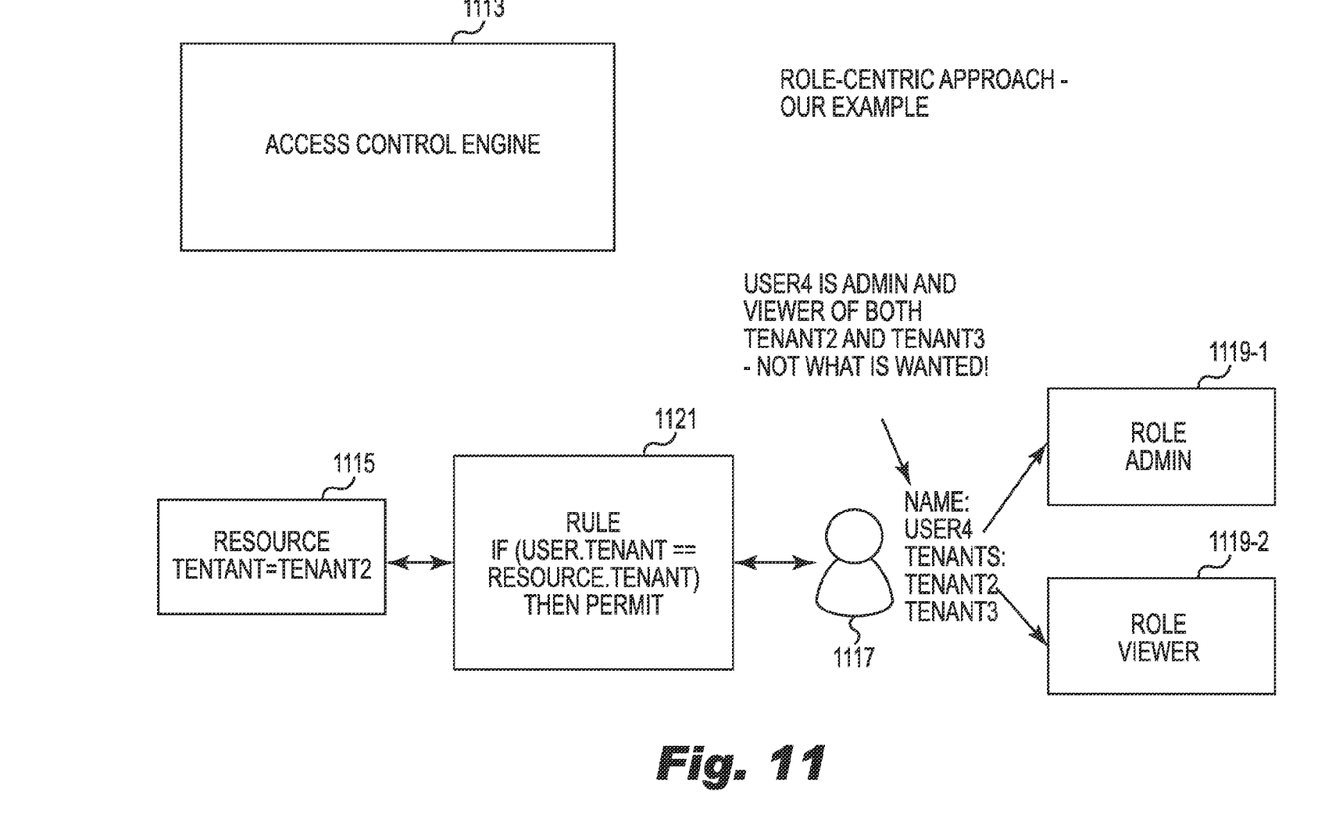
FIG. 11 illustrates an example of how using a role centric approach would not achieve the solution provided by embodiments of the present disclosure.

FIGS. 9, 10 and 11 further contrast these other approaches to the embodiments of the present disclosure.

FIG. 9 illustrates an example of a prior art computer implemented model for access authorization according to an attributes based access control (ABAC) approach. As shown in FIG. 9, an access control engine 913 would execute instructions to create, define and assign attributes, e.g., location and time, to particular users, resources, and environments. In this example, a particular resource 915 is illustrated with a location, e.g., attribute, in Israel. Three users (3), user Karl 917-1, user Moshe 917-2, and user David 917-3 are shown for ease of illustration. User Karl 917-1 has been assigned the role 919-1 of doctor and a location 920-1, e.g., attribute, in Spain. User Moshe 917-2 has been assigned the role 919-2 of supervisor with a location attribute 920-2 of the USA. User David 917-3 has been assigned the role of supervisor 919-3 with a location attribute 920-3 in Israel.

Under the ABAC model, the access control engine 913 would further execute instructions to create, define and apply rules, e.g., Rule 1 (921-1), Rule 2 (921-2) and Rule 3 (921-3). The rules can include actions, conditions, permissions, etc. The access control engine would then execute instructions to determine if a given user 917-1, 917-2, and 917-3 is permitted to perform a particular action based on applying the assigned attributes and rules. For example, Rule 1 (921-1) dictates that if a particular "action" is to give medicine and a particular user's "role" is doctor, then permit. Rule 2 (921-2) dictates that if a particular user's "location" matches a resource location, e.g., resource location 915 in Israel, and a "time" attribute is before 8:00 pm (e.g., 20 hour(s)) then permit.

As seen in FIG. 9, satisfying Rule 1 (921-1), would permit user Karl 917-1 with a role of doctor, but a location attribute 920-1 in Spain, to be authorized access to administer the medicine to a resource 915 in Israel. However, additional rules may need to be added to fit with a resource 915 location in Israel, thus adding to the complexity of the model in large scale enterprise applications. Similarly, satisfying Rule 2 (921-2) would permit user David 917-3 with a location attribute 920-3 in Israel, but a role of supervisor 919-3, to be authorized access to administer medicine, since both the resource 915 and the user 917-3 possess the location attribute of Israel. However, additional rules may need to be added to fit with a role 919-1 of doctor, thus adding to the complexity of the model in large scale enterprise applications. Hence, additional rules, e.g., Rule 3 (921-3), could and would have to be created. However, this quickly adds to the cost and complexity of defining and maintaining an authorization model of large scale enterprise applications, particularly in a multi-tenant cloud computing environment.

FIG. 10 illustrates an example of a prior art computer implemented model for role centric access authorization according to a combination of an ABAC and RBAC approach. As mentioned above, in an ABAC model an access control engine 1013 would execute instructions to create, define and assign attributes, e.g., location and time rules, to particular users, resources, and environments. And, in an RBAC model and access control engine 1013 would execute instructions to allow restricting roles to users, such that the "role centric" combination of ABAC and RBAC model approach may execute instructions to allow restricting RBAC using attributes that may be put on "users" or "resources" (e.g., the hardware, software, firmware and data resources). However, the "role centric", combination of ABAC and RBAC, model approach would not allow program instructions to execute to have different restrictions for different "user-role" assignments.

Hence, in the role-centric approach model of FIG. 10, an access control engine 1013 would execute instructions to create, define and assign restrictions in the form of attributes, e.g., location and time, to particular users. The attribute restrictions could be placed on users or resources. The role-centric RBAC model does not include an option to have different restrictions for different "user-role" associations.

In this example, a particular resource 1015 is illustrated with a location, e.g., attribute, in Israel. Three users (3), user Karl 1017-1, user Moshe 1017-2, and user David 1017-3 are again shown for ease of illustration. User Karl 1017-1 has been assigned the role 1019-1 of doctor and a location 1020-1, e.g., attribute, of Spain. User Moshe 1017-2 has been assigned the role 1019-2 of supervisor with a location attribute 1020-2 of the USA. User David 1017-3 has also been assigned the role of supervisor 1019-2 with a location attribute 1020-3 in Israel.

In FIG. 10, satisfying Rule 1 (1021-1), e.g., if a particular "action" is to give medicine and a particular user's "role" is doctor, would permit user Karl 1017 to be authorized access to administer medicine to resource 1015 having a location attribute restriction of Israel. However, here again, additional rules may need to be added to fit with a resource location 1015, even though user Karl 1017-1 has an appropriate role of doctor 1019-1. This again adds to the complexity of the access authorization model for in large scale enterprise applications. In this example, users Moshe 1017-2 and David 1017-3 would not qualify since they have the assigned roles of supervisor 1019-2, even though user David 1017-2 has a matching location attribute 1020-3 of Israel. FIG. 10 further illustrates, e.g., by the arrowheads, how quickly the complexity of the look ups can become in the role centric approach and, if applied to a large scale enterprise applications, can become even more complex. Thus, without the ability to have different restrictions placed on different "user-role" associations, as provided by embodiments of the present disclosure, additional rule complexity, e.g., Rule 2 (1021-2) and Rule 3 (1021-3), would have to be created. This can add to the cost, in addition to the complexity, of defining and maintaining an authorization model of large scale enterprise applications, particularly in a multi-tenant cloud computing environment. Further, in a model with many rules it is difficult to answer questions like "which users have access to resoruce1", or which resources can user2 access, etc.

FIG. 11 illustrates an example of how using a "role centric" approach, e.g., as shown in FIG. 10, would not achieve the solution provided by embodiments of the present disclosure. Using the example problem described in connection with FIG. 8 having four (4) users and three (3) tenants, an access control engine 1113 could execute instructions to create, define and apply a tenant attribute restriction to each resource 1115, e.g., tenant 2. Further, the access control engine 1113 could execute instructions to create, define and apply a set of "role-tenant" attribute restrictions or a "permission-tenant" attribute restriction to each user 117. As used in the example, a "role" is a set of permissions like "editor" that may edit several things. Also, as used in this example, a "permission" intends a permission like edit_name, view_name, edit_phone, etc.

As shown in FIG. 11, if the access control engine 1113 executes instructions to apply a "role-tenant" attribute restriction to user 4 from FIG. 8, user 4 would have two (2) "role-tenant" attribute restrictions, e.g., a "tenant 2-role viewer (119-2)" restriction and a "tenant 3-role admin 1119-1" restriction.

In this example, as shown in FIG. 11, Rule 1 (1121) dictates that if a particular user's tenant attribute restriction matches a particular resource's tenant attribute restriction, then permit. In this example, user 4 would have a matching tenant attribute restriction of tenant 2, but user 4 also has roles of both "viewer" and "admin". Hence, user 4 would have admin and viewer role permission, e.g., access authorization, for both tenant 2 and tenant 3 which is not what was intended.

Alternatively, if the access control engine 1113 executes instructions to apply the "permission-tenant" scenario then it could execute instructions to create and apply a rule such that a user would be permitted to edit a resource if the user has a "permission-tenant X" attribute restriction and the tenant of the resource attribute restriction matches tenant X. However, since an authorization model of large scale enterprise applications will have dozens or more of permissions, using the "permission-tenant" attribute restriction approach would quickly become overly complex and not reasonable to implement, particularly in a multi-tenant cloud computing environment.

From the above examples, in FIGS. 9-11, it can be seen that the main disadvantages of ABAC include the following. First, the set of rules may be very big and very complex. That is, for each permission, there may be up to $2^N$ rules. Second, analyzing and changing user's permissions may be very hard. Looking at the set of rules, it is hard to determine who has access to what, and answer questions like which resources are accessible to a certain user; or which users may access a certain resource. Third, the access control engine may become complex and time consuming.

As for the role-centric approach, in this model the RBAC is the base, and attributes may be added to restrict given access. In above example of FIG. 11, contrasted to embodiments of the present disclosure, e.g., FIGS. 1-2, 4-8, program instructions can be executed to create Admin and Viewer roles, and execute to assign them to different users. Program instructions can then be executed to try and restrict the users, e.g., user 4, according to tenant assignments. However, the difficulty to understand here is that if a user tenant attribute restriction is applied, e.g., tenant 2, then the user will be given all permissions on all resources with the tenant 2 attribute according to "all" of user 4's roles, which may not be intended.

The above specification, examples and data provide a description of the method and applications, and use of the system and method of the present disclosure. Since many examples can be made without departing from the spirit and scope of the system and method of the present disclosure, this specification merely sets forth some of the many possible example configurations and implementations.

Although specific examples have been illustrated and described herein, those of ordinary skill in the art will appreciate that an arrangement calculated to achieve the same results can be substituted for the specific examples shown. This disclosure is intended to cover adaptations or variations of one or more examples of the present disclosure. It is to be understood that the above description has been made in an illustrative fashion, and not a restrictive one. Combination of the above examples, and other examples not specifically described herein will be apparent to those of skill in the art upon reviewing the above description. The scope of the one or more examples of the present disclosure includes other applications in which the above structures and methods are used. Therefore, the scope of one or more examples of the present disclosure should be determined with reference to the appended claims, along with the full range of equivalents to which such claims are entitled.

The term "a number of" is meant to be understood as including at least one but not limited to one.

What is claimed:

1. A method for managing access authorization to hardware and data resources, comprising:
   using an access engine having a processing resource to execute computer readable instructions stored on a non-transitory medium to:
   define a property of a resource;
   define a role having permissions, wherein each defined role can be reused with different users without modification;
   define a security domain for the property of the resource;
   assign the defined role to a user in a context of the defined security domain wherein the context of the defined security domain restricts a permission of the defined role assigned to the user; and
   assign a purpose, a condition, and a location attribute to a user-role assignment, wherein the attribute applies to all permissions for the user-role assignment rather than on a permission by permission basis.

2. The method of claim 1, wherein defining a role includes defining a role including at least one of an administrate role and a viewer role.

3. The method of claim 2, wherein the method includes assigning a permission to a role, wherein assigning a permission includes at least one of an edit and view permission and a view only permission.

4. A non-transitory computer-readable medium storing a set of instructions executable by a computer, wherein the set of instructions are executed by the computer to:
   define a property of a network resource;
   define a tenant as associated with the property of the resource;
   define a role having permissions, wherein each defined role can be reused with different users without modification;
   define a security domain for the property of the resource;
   assign the defined role to a user in the context of the defined security domain;
   assign at lease one of a purpose, a condition, and a location attribute to a user-role assignment; and
   assign the defined security domain to the tenant along with the assigned user-role assignment, wherein the defined security domain restricts a permission of the defined role in the user-role assignment rather than on a permission by permission basis.

5. The non-transitory computer readable medium of claim 4, wherein the set of instructions are executed to define a security domain include associating a user to a role in defining a security domain in connection with each user of a tenant.

6. The non-transitory computer readable medium of claim 5, wherein the set of instructions are executed to create the user-role association upon at least one of creating a new tenant, defining a new security domain, adding a new user, removing a user, defining a new role associated with a user.

7. A system for managing access authorization to hardware and data resources, the system comprising:
   an access control engine having:
   a processing resource; and
   a non-transitory computer readable medium, wherein the non-transitory computer readable medium includes instructions segmented into a number of modules, the number of modules including:
   a role module including instructions executed by the processing resource to define a role having permissions, wherein each defined role can be reused with different users without modification;
   a security domain module including instructions executed by the processing resource to define a security domain according to a property of a resource in a context of a user-role assignment such that the defined security domain distinguishes between different resource scopes according to a classification of resources;
   a permission module including instructions executed by the processing resource to grant a role to a user in the context of the security domain; and
   an attribute module including instructions executed by the processing resource to assign a purpose, a condition, and a location attribute to a user-role assignment such that the attribute applies to all permissions for the user-role assignment rather than on a permission by permission basis.

8. The system of claim 7, wherein the security domain module includes instructions executed to distinguish between different classifications of resources selected from a region, a tenant, and a company.

* * * * *